June 2, 1970 W. G. O'CONNELL ET AL 3,515,780
PROCESS FOR DRYING GEL-REGENERATED CELLULOSE FILM
Filed March 21, 1967 2 Sheets-Sheet 1

INVENTORS
WILLIAM GROGAN O'CONNELL
HERBERT BROOKS SANFORD, JR
BERNARD S. EDWARDS

BY *Claude L. Beaudoin*

ATTORNEY

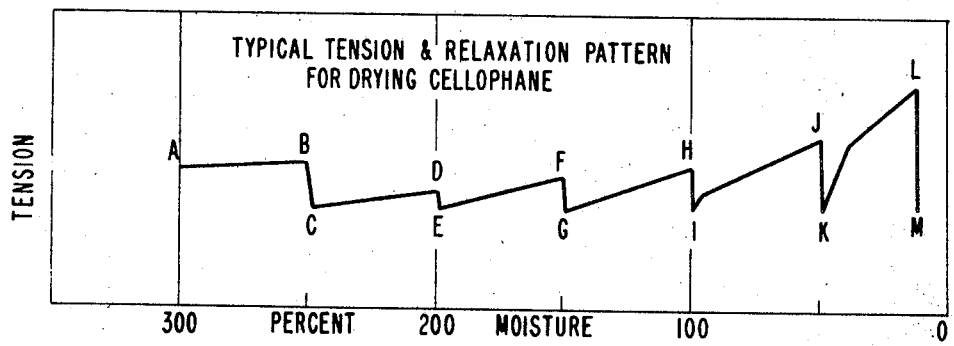
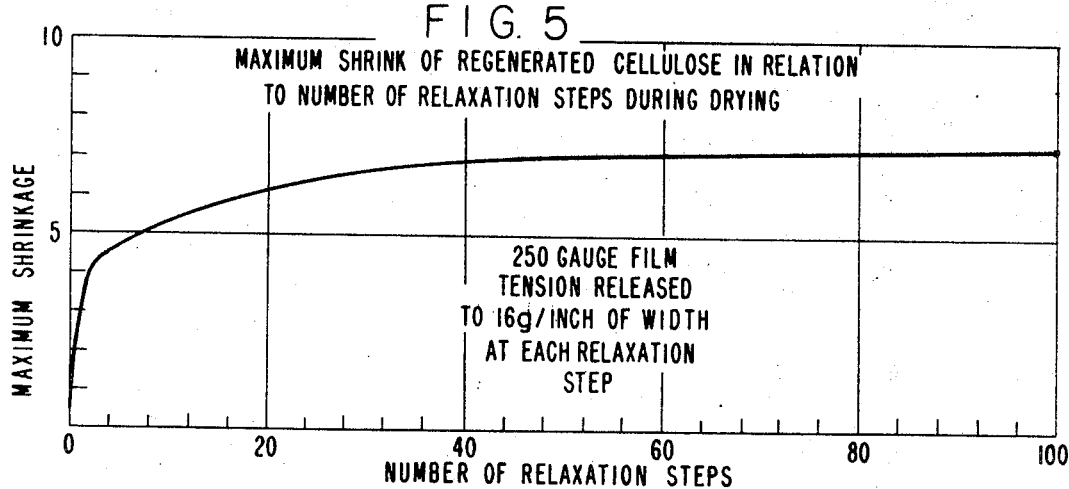
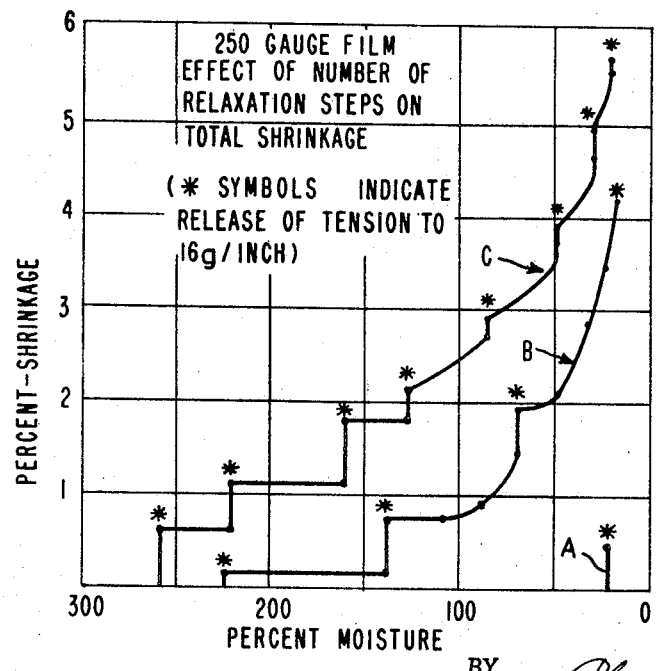
INVENTORS
WILLIAM GROGAN O'CONNELL
HERBERT BROOKS SANFORD, JR.
BERNARD S. EDWARDS
BY *Claude L. Beaudoin*
ATTORNEY 3,515,780
PROCESS FOR DRYING GEL-REGENERATED
CELLULOSE FILM
William Grogan O'Connell, Buffalo, Herbert Brooks
Sanford, Jr., Kenmore, and Bernard S. Edwards,
Tonawanda, N.Y., assignors to E. I. du Pont de
Nemours and Company, Wilmington, Del., a corporation of Delaware
Filed Mar. 21, 1967, Ser. No. 624,900
Int. Cl. B29c 25/00; F26b 3/24
U.S. Cl. 264—342                     2 Claims

ABSTRACT OF THE DISCLOSURE

Regenerated cellulose film structures containing up to 350% moisture are dried to about 8% moisture while shrinking said film structures between 5% and 11% in the length direction thereof by passing the wet film structures over drying rolls and relieving tension therein while also maintaining the film structures in intimate contact at all times with the surfaces of the drying rolls. Permitting the film to shrink at least 3% before 40% of the original moisture content is removed results in a greater degree of total shrinkage.

---

Figure 1:
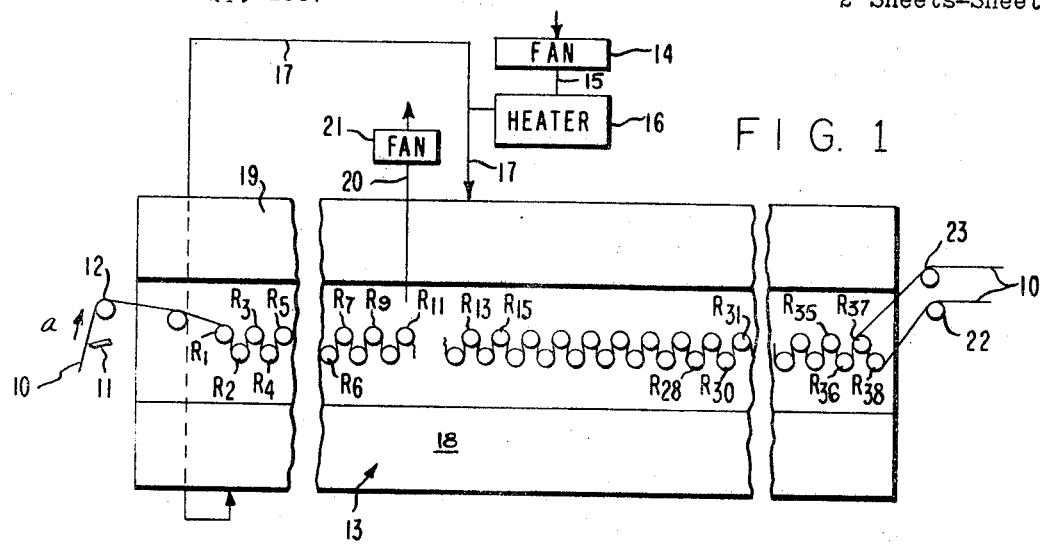

The present invention relates to the manufacture of cellophane film structures and, more particularly, is directed to a novel process for drying film structures of regenerated cellulose.

The process of the present invention is generally applicable to the production of cellophane film structures derived from any film forming cellulosic material as are obtainable by means of the well-known cupro-ammonium process or the xanthate process. Because of the commercial importance of cellulose film structures obtained by the xanthate process, such cellulose material constitutes the preferred cellulose material utilized in the process of the present invention, and the invention will be described hereinafter with specific reference to the drying of regenerated cellulose film structures derived from the xanthate process.

Regenerated cellulose film structures are generally prepared by extruding an alkaline solution of cellulose xanthate (viscose) through a long, thin casting die or hopper into a sulfuric acid-sodium sulfate coagulation-regeneration bath, which first coagulates the cellulose xanthate as a coherent sheet of film, then decomposes the xanthate to produce a highly swollen, moisture-laden gel-film structure of regenerated cellulose. The freshly formed gel-film structure is subsequently passed through a series of liquid treating baths to wash, desulfurize, bleach and plasticize the film structure to remove impurities, improve its brightness, flexibility and strength. The foregoing process is described in greater detal in, for example, U.S. Pat. No. 1,548,864. The purified and plasticized film structure is then dried while passing over a series of heated drums.

The drying step or operation in the above-described process is ordinarily performed by any one of several techniques including generally conducting the gel-regenerated cellulose film over one or more heated cylindrical rolls in a suitable enclosure having forced hot air circulating therewithin. Numerous techniques have evolved for drying gel-regenerated cellulose film structures such as, for example, that disclosed in U.S. Pat. No. 2,275,348, which describes drying cellulose film structures in a two-step process consisting of a first step of preliminarily drying the cellulose sheet to a moisture content of at least 100% while maintaining the cellulose sheet substantially free of tension followed thereafter by the second step of completing the drying of the cellulose sheet to about 8% moisture while maintaining the sheet under tension. In contrast to the foregoing, U.S. Pat. No. 3,068,529 discloses a three-step process for drying regenerated cellulose film structures which comprises step (1) of drying gel-regenerated film to about 100% to 120% moisture while applying 2 to 4% draw, step (2) of further drying the film structure to about 25 to 60% moisture while permitting about 1.5 to 2.5% relaxation thereof, and step (3) of completing the drying of the film structure to about 3 to 7.5% moisture while applying from about 0.5 to 1.0% draw thereto. The fact that the drying processes described in these patents seem inconsistent, i.e., one patent specifies a first drying step while maintaining the film structure free of tension while the other patent specifies drying while maintaining the film structure under tension or draw, attests to the empirical nature of the cellophane drying art. A major drawback and problem encountered heretofore in the drying of cellulose film structures is the inability to obtain film structures having satisfactory sheet flatness properties and durability, especially cold-state durability. The packaging industry has become increasingly more demanding as regards the toughness and durability properties of packaging materials. The prevalence on the market of many thermoplastic organic polymeric packaging materials offering such benefits, usually associated with higher cost packaging materials, has resulted in the requirement by the industry of more rigid performance specifications as regards the lower cost gel-regenerated cellulose film structures. The cellophane industry has been striving to produce film structures having more durable performance characteristics such as toughness and durability without loss of sheet flatness.

According to the present invention there is provided a process for drying gel-regenerated cellulose film structures containing up to 350% moisture, based upon the moisture-free cellulose content of said film structure, which comprises passing said moisture-laden cellulose film structure over a plurality of heated drying rolls and allowing said film structure to shrink in its longitudinal or length direction between about 5% and about 11%, based upon the initial length thereof, by systematically relaxing said film structure and relieving the ension build-up therein in at least four relaxation steps before about 95% of the moisture in said film structure, based upon the initial moisture content thereof, is removed while simultaneously maintaining said film structure under restraint or tension sufficient to maintain said film structure in intimate contact with the surfaces of said drying rolls whereby to provide a cellulose film structure having between about 2% and about 8% moisture, based upon the moisture-free cellulose content thereof, characterized by excellent sheet flatness and durability.

In one of its preferred aspects, the process of the present invention comprises passing a cellulose film structure containing up to about 350% moisture, based upon the moisture-free cellulose content thereof, over a plurality of heated drying rolls and allowing said film structure to shrink at least 3% in its longitudinal direction, based upon the initial length thereof, by relaxing said film structure and relieving the tension build-up therein before 40% of the moisture in the said film structure, based upon the initial moisture content thereof, is removed, while simultaneously maintaining said film structure under restraint or tension sufficient to maintain said film structure in intimate contact with the surfaces of said drying rolls. In another preferred embodiment of the process of the present invention as above described, the film structure is maintained under restraint or tension by being tensilized at least 16 grams per inch across its width thereby to maintain said film structure in intimate contact at all times with the surfaces of the drying rolls.

Figure 2:
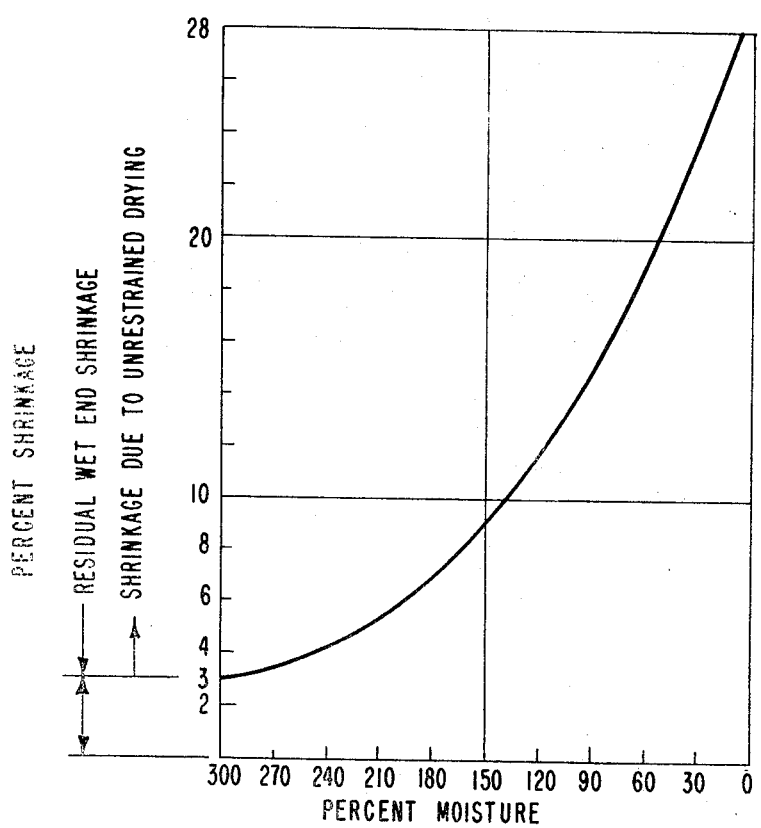

The nature and advantages of the process of the present invention will be more clearly understood by the following description and the several figures illustrated in the accompanying drawings in which:

FIG. 1 is a schematic representation of a drying device which may be utilized for practicing the process of the present invention;

FIG. 2 graphically depicts the shrinkage of gel-regenerated cellulose film structures as a function of the moisture content thereof;

FIG. 3 schematically depicts the tension and relaxation pattern of gel-regenerated cellulose film structures as a function of the moisture content thereof;

FIG. 4 graphically depicts the shrinkage of gel-regenerated cellulose film structures as a function of the moisture content thereof, and the effect of relaxing gel-regenerated cellulose film structures during drying thereof; and FIG. 5 graphically illustrates the shrinkage of gel-regenerated cellulose film structures as a function of the total number of relaxation steps utilized during the drying thereof.

The process provided by the present invention is specifically adapted to the drying of gel-regenerated cellulose film structures. The term "gel-regenerated cellulose film" is used in the present specification to describe the moisture-laden regenerated cellulose film structure entering the drying phase of the overall cellophane production process. The "gel" state of the cellulose film structure is indeed descriptive of the film structure leaving the last of several treatment tanks wherein the freshly cast cellulose film is regenerated and conditioned in the manner described in greater detail in the above-mentioned U.S. Pat. No. 1,548,864. The cellulose film structure in this state is highly saturated with aqueous solutions from the treatment tanks, and the moisture content of the cellulose film structure at this point may extend up to 350%, by weight based upon the moisture-free cellulose content thereof.

The initial aspect of the process of the present invention comprises passing the moisture-laden gel-regenerated cellulose film structure over a plurality of heated drying rolls. This may be accomplished by any suitable means as by continuously moving a continuous length of the gel-regenerated cellulose film structure through a sinuous path provided by a plurality of rotatably driven rolls disposed generally horizontally in alternating fashion in two or more planes so that the film structure is at all times maintained in intimate contact with the surfaces of the drying rolls in the manner as shown generally in FIG. 1. Referring now to FIG. 1, the moisture-laden gel-regenerated cellulose film structure 10 from the treatment tanks (not shown) travels in a continuous manner in the direction indicated by arrow *a* through or past a suitable means 11 such as a scraper or doctor knife which removes most of the surface liquid as may be present thereon, and over a roller 12 and then into an enclosed dryer device 13 having suitable walls (not shown) for confining therewithin the drying rolls and the moisture evaporated from the drying cellulose film structure. The drying rolls are generally designated by the symbol R and are cylindrically shaped and suitably journaled for rotation in the structure of the dryer device; the drying rolls may be rotated by any suitable means such as by gear trains, belts, or electrical speed control drives operatively connected to either each individual roll or groups of rolls. The drying rolls are preferably located with respect to each other in the manner shown in FIG. 1 which depicts for exemplary purposes the odd-numbered drying rolls disposed in a uniplanar axial relation above the even-numbered drying rolls also disposed in a uniplanar axial relation with respect to each other. The specific arrangement of the drying rolls is not an essential requirement and any arrangement that facilitates maintaining the cellulose film structure in intimate contact at all times with the surfaces of the drying rolls is indeed satisfactory. The total number of drying rolls is not an essential requirement, and obviously the total number of drying rolls utilized will be chosen on the basis of obtaining satisfactory drying performance consistent with economic considerations. Satisfactory results have been obtained utilizing a dryer device having a total of 102 drying rolls therein.

The drying rolls R in the dryer device depicted in FIG. 1 are heated by any suitable means such as, for example, circulating either heated water or steam through each individual drying roll. The operating temperature of the drying rolls while conducting the process of the present invention may be up to about 250° F.; in a preferred embodiment the drying rolls in the dryer device are grouped into two groups in which the first group of rolls are those located in the portion of the dryer device in which occurs most of the specified shrinkage of the cellulose film structure and these drying rolls are operated preferably between about 220° F. and about 250° F., and the remaining drying rolls constituting the second group are maintained at a temperature between about 16° F. and about 215° F.

Heated air also is continuously circulated through the drying device while the cellulose film structure is traveling therethrough. The flow of heated air through the drying device is shown schematically in FIG. 1 whereby air enters the intake plenum of fan or blower 14 which moves the air through a suitable conduit 15 to heater device 16 which heats the air to a temperature of about 185° F. The heated air leaving heater device 16 is conducted in appropriate piping or ducting 17 to distribution ducts or chambers 18 and 19 from whence it issues through suitable outlets such as perforations into the drying device. The heated air after having circulated through the dryer device is exhausted therefrom along with the moisture vaporized from the cellulose film structure by means of conduit 20 and exhaust fan 21.

When the cellulose film structure has been dried to the desired moisture level, usually anywhere between about 3% and about 8% moisture content, by weight based upon the moisture-free cellulose content thereof, it is directed out of the dryer device and over a roll 22 and thence to a winding station where it is wound into a roll of cellophane. In instances where double sheet casting and drying are utilized, the second sheet of the cellulose film structure is directed to a separate roll such as 23 and then to a wind-up station similar in nature to that above described.

A salient feature of the process of the present invention is that wherein the cellulose film structure is shrunk in is longitudinal or length direction between about 5% and about 11%, based upon its initial length, by systematically relaxing said film structure and relieving the tension build-up therein in at least four relaxation steps before about 95% of the moisture in said film structure, based upon its initial moisture content, is removed therefrom. The foregoing will be better understood by reference to the following more detailed discussion regarding the drying of the cellulose film structures.

Referring now to FIG. 2, it shows in graphical form the unrestrained shrinkage curve or pattern of a typical gel-regenerated cellulose film structure, 140 gauge film in this instance. The term "gauge" as used herein with reference to film structures is a measure of the thickness of said film structures and, more specifically, refers to the total area in square inches of the film divided by 100 that is obtainable from one pound of the film material. For example, a 250 gauge film means that one pound of the dried film will provide 25,000 square inches of film product. The ordinate in FIG. 2 represents the percent shrinkage of the cellulose film structure, based upon its initial length before shrinking, and the abscissa represents the weight percent of moisture in the cellulose film structure, based upon the moisture-free cellulose content thereof. Also shown on the ordinate in FIG. 2 is an element of the total shrinkage of cellulose film structures which is denominated as the residual wet-end shrinkage, $S_w$. The residual wet-end shrinkage, $S_w$, is due to the elastic character of gel-regenerated cellulose film structures and occurs upon releasing the tension accumulated therein during the processing in the treatment tanks and the removal of excess surface liquid therefrom. Shrinkage of the moisture-laden gel-regenerated cellulose film structure of as much as 6% has been experienced upon releasing the above-mentioned accumulated tension. It has been found that the residual wet-end shrinkage is lost when cellulose film structures are dried without permitting any relaxation thereof, and contrary to the ordinary reckoning of the art, it is a salient and essential feature of the process of the present invention to recover the available residual wet-end shrinkage of the cellulose film structure. The residual wet-end shrinkage of the cellulose film structure may be recovered in any suitable manner as by allowing the moisture-laden gel-regenerated cellulose film structure to relax prior to subjecting said film structure to drying or by initially subjecting the film structure to controlled drying conditions whereby said film structure is simultaneously relaxed and dried while at all times maintaining said film structure in intimate contact with the surfaces of the drying rolls. In a preferred aspect of the process it has been found that approximately 3% shrinkage of the length of the incoming web must be achieved in the drying process before approximately 40% of the cellulose film structure's initial moisture content is removed in order to recover the attainable residual wet-end shrinkage.

The curve shown in FIG. 2 was obtained by drying the gel-regenerated cellulose film structure without applying any restraint thereto and, therefore, it represents an idealized shrinkage curve or pattern which is impracticable for commercial utilization because unrestrained shrinkage, although yielding film structures of improved toughness and durability, results in severe puckering and wrinkling of the film structure which is thus characterized by poor and unsatisfactory gauge or thickness transverse profile and sheet flatness. It has now been found that the cellulose film structure must at all times be maintained in uniform and intimate contact with the surfaces of the drying rolls and to this end, the tension of the cellulose film structures must not drop to zero; the tension of the film structure should be not less than about 16 grams per inch of width of the cellulose film structure.

A more typical drying curve or pattern of cellulose film structures of the present invention is shown in FIG. 3 which depicts tension along the ordinate and percent moisture along the abscissa as regards the drying as obtained in the device of FIG. 1. The cellulose film structure enters the dryer device at a tension level corresponding to point A in FIG. 3. The film structure dries while in contact with the surface of the drying rolls and if it travels from one drying roll to another, each being operated at the same peripheral speed, the film structure will dry with little or no shrinkage and experience an increase in tension in its longitudinal or machine direction. The above-mentioned tension build-up may be relieved by directing the film structure to a next succeeding drying roll operated at a lower peripheral speed in relation to the immediately preceding drying roll. The net effect is that the tension of the film structure will be relieved or, as denominated herein, whereby the film structure is allowed tot shrink. The important consideration during the relaxation step is that the tension of the cellulose film structure must not be allowed to drop to zero. Referring again to FIG. 3, the cellulose film structure experiences an increase in tension as the moisture content thereof decreases during drying, as is shown by the positive slope of the line connecting points A and B. The tension of the film structure should now be dropped to some minimum value, such as about 16 g./inch of width, in order to relieve the accumulation of tensile forces while still maintaining intimate contact of the film structure with the drying roll surface. This may be done by moving the film structure onto a drying roll operating at a lower surface speed. Again, the cellulose film structure is dried resulting in some increase in tension to point D, at which time the cellulose film structure is passed to a drying roll operating at a slower surface speed and the tension thereof is again relieved. The foregoing pattern is repeated throughout the drying period for optimum drying in order to increase the toughness and durability of the film structure.

FIG. 3 also shows that the increase in tension of the cellulose film structure becomes greater for unit change in moisture content as the drying thereof progresses. The above increase in tension is gradual to a point corresponding to about 100% moisture content, after which there is an abrupt change in the modulus of elasticity of the film structure resulting in higher tensions for unit moisture loss thereof. High tension levels in the cellulose film structure are undesirable and must be avoided, especially since tension causes the cellulose film structure to "set" resulting in a loss in the potential available shrinkage thereof. In the extreme case where the cellulose film structure is dried under total restraint, the "set" may be complete and all, or almost all, of the potential shrinkage is lost.

The foregoing is clearly shown in FIG. 4 which shows the results of laboratory drying in which the cellulose film structure was dried on a drying roll surface, and the tension of the film structure was released to 16 g./inch of film width at various intervals during the drying sequence. Sample "A" was held to almost complete dryness before relaxing and shrank only 0.45%. Sample "B" was relaxed four (4) times and shrank 4.2%. Sample "C" was relaxed eight (8) times and shrank 5.7%. The above mentioned shrinkage figures do not include the residual wet-end shrinkage which may account for up to 6% additional shrinkage capability. The important consideration of the results shown in FIG. 4 is that the film samples "B" and "C" were characterized by excellent cold-state durability, whereas, sample "A" had poor cold-state durability.

The desirability of the process of the present invention, especially that of recovering as much as possible of the available residual wet-end shrinkage, is clearly shown in FIG. 5 which depicts ingraphical form the maximum shrinkage obtainable while drying a cellulose film structure of 250 gauge wherein the film structure is relaxed to a tension of 16 grams per inch of width of the film structure. The ordinate depicts the maximum shrinkage value, based upon the initial length of the sample cellulose film structure, and the abscissa depicts the number of relaxation steps. As seen in FIG. 5, there is an initial rapid gain in maximum shrinkage attainable in the first few relaxation steps. Thereafter, the gain is considerably less. For instance, about 1% shrinkage is obtained in going from 6 to 20 relaxation steps, while about 55 more steps are necessary to obtain an additional 1% shrinkage. It is thus seen that it is extremely difficult and indeed impracticable to obtain much more than about 7% shrinkage of the cellulose film structure shown in FIG. 5 during the drying thereof and, for this reason, it is essential in order to obtain high shrinkage values associated with excellent cold-state durability to recover as much as possible of the residual wet-end shrinkage of the cellulose film structure while simultaneously maintaining only sufficient tension thereon for maintaining said film structure in intimate contact at all times with the surfaces of the drying rolls in order to obtain a cellulose film structure having the necessary sheet flatness quality.

The principle and practice of the present invention will now be illustrated by the following examples which are exemplary only and it is not intended that the invention be limited thereto since modification in technique ad operation will be apparent to anyone skilled in the art. All parts and percentages specified herein are by weight unless otherwise specified.

The test samples prepared in the following examples were evaluated as regards durability in accordance with the following testing procedure.

Bag drop test

The bag drop test (cold) is a primary test of the durability performance of cellophane film. The cellophane film samples to be tested are coated in a conventional manner with vinylidene chloride copolymer coating compositions as described in U.S. Pat. No. 2,570,478 whereby to permit the film samples to be fabricated into bags on a Simplex foldover-bottom bag making machine. Each bag is 13" long and 4½" wide having a 1" overlap on the back seal and 1½" gussets. The test bags are hung on a rod and conditioned for two weeks at 20% relative humidity and 72° F. dry bulb temperature. Following the conditioning period, the test bags are each filled with 410 grams of 1" diameter hard plastic bottle caps. The tops of the bags are then folded over and sealed on an Amsco crimp sealer. The filled and sealed bags are packed in a compartmented plastic case having eighteen compartments therein. Nine bags fabricated of the test cellophane film and nine bags fabricated of a control film are packed in an alternating pattern in each case. A total of nine packed cases are employed in the test.

After the cases are packed and sealed they are placed in a cold room maintained at 0° F. for a period of 36 hours. The cases which have been conditioned at 0° F. are repeatedly dropped from a one foot height onto a steel plate a sufficient number of times to cause at least a 50% breakage of the filled and sealed bags therein. A 1" or longer tear is considered as a bag breakage. The cases are then left at room temperature and statistically graded.

EXAMPLE 1

A gel-regenerated cellulose film of 160 gauge issuing from the last treatment bath of a viscose regenerating apparatus and containing 208% moisture was passed at 110 yards per minute into a cellophane dryer having 102 drying rolls. The first 40 drying rolls were steam heated (3 to 6 p.s.i.g. steam pressure), and each alternate one of the next 52 drying rolls were heated by means of hot water at 80° C. to 90° C., and the remaining drying rolls were not heated.

The first four rolls in the dryer were operated at a peripheral speed 0.5% greater than the peripheral speed of the last roll in the last treatment tank. The gel-regenerated cellulose film was then passed over nine rolls operating at the same peripheral speed as the peripheral speed of the last roll in the last treatment tank.

Following this, the gel-regenerated film was passed over successive sets of rolls in which the peripheral speed was reduced in 10 individual steps to a cumulative total relaxation of 6.8% at which point the film had lost 90.5% of its initial moisture content. The relaxed film was then slightly tensilized by passing it over succeeding rolls during which time it was subjected to 1% draw to provide for improved sheet flatness.

The 160 gauge cellulose film prepared in this example was subjected to the bag drop test along with a control film of 140 gauge which is 14% thicker but which was relaxed only 3.4% in two steps before tensilization, and the test results are presented in Table 1 herebelow:

TABLE 1

| Sample | Film Thickness | Relaxation Steps | Percent Relaxation | Percent Breakage |
|---|---|---|---|---|
| A | 160 gauge | 10 | 6.8 | 48.2 |
| B | 140 gauge | 2 | 3.4 | 59.3 |

The results show that the lighter gauge film of 160 gauge relaxed 6.8% in ten steps was at least as durable as heavier gauge film relaxed 3.4% in two steps.

EXAMPLE 2

Two gel-regenerated cellulose films from the last treatment bath of a viscose regenerating apparatus were passed simultaneously into a cellophane dryer. Both webs were of 230 gauge and contained 228% moisture.

The first 50 drying rolls in the dryer were heated by steam at 3 to 6 p.s.i.g. pressure. The next 52 rolls were heated by hot water at 80 to 90° C. while the remaining 8 rolls were not internally heated. The relaxation pattern employed was similar to that as described in Example 1. Three percent relaxation occurred before 30% of the initial moisture content of the cellulose film was removed and the 6.8% relaxation occurred before 94.9% of the initial moisture content of the cellulose films was removed.

The double-sheet cast 230 gauge cellulose film was subjected to the bag drop test along with a control film of double-sheet cast 195 gauge film made with no relaxation, and the test results are presented in Table 2 herebelow:

TABLE 2

| Sample | Film thickness | Relaxation steps | Percent relaxation | Percent breakage |
|---|---|---|---|---|
| A (lower web) | 230 guage | 10 | 6.8 | 38.3 |
| B (lower web) | 195 guage | None | None | 38.3 |
| C (upper web) | 230 guage | 10 | 6.8 | 18.5 |
| D (upper web) | 195 guage | None | None | 42.0 |

The test results show that 230 gauge film processed by a double-sheet casting technique and relaxed 6.8% in ten steps is equal to and even better as regards durability than a heavier 195 gauge film processed in the same manner but with no relaxation steps.

EXAMPLE 3

A gel-regenerated cellulose film issuing from the last treatment bath of a viscose regenerating apparatus and containing 170% moisture was passed at 84 yards per minute into a cellophane dryer consisting of 102 drying rolls. The first 40 drying rolls were heated by steam at 3 to 6 p.s.i.g. pressure, and each alternate one of the next 52 drying rolls was heated by hot water at 80 to 90° C., and the remaining rolls had no internal supply of heat.

The cellulose film was a 140 gauge film (to ultimately yield 14,000 sq. inches/lb. of dried film). The first four rolls were run 0.5% faster than the last roll in the last treatment bath to ensure a flat laydown of the sheet of cellulose film. The next nine rolls were operated at the same peripheral speed as the peripheral speed of the last roll in the last treatment tank.

The cellulose film was then relaxed 3.33% and held in this relaxed state while being passed over nine drying rolls. At this time the film was relaxed an additional 3.55% and was held in this relaxed state while being passed over 17 drying rolls. The film was then passed over succeeding drying rolls during which time it was tensilized by applying thereto 1% draw to provide better sheet flatness.

The cellulose film lifted from the drying roll surface during the second relaxation step resulting in wrinkles and folds therein and operating difficulties. Approximately 75% of the cellulose film was rejected because of poor and unacceptable quality. It was noted that the total relaxation of 6.88% could not be taken in two relaxation steps because the process did not meet the criterion of maintaining the film under restraint or tension sufficient to hold the film in intimate contact with the surface of the dryer rolls.

We claim:

1. A process of manufacture for drying gel-regenerated cellulose film structures containing from 208% to 350% moisture, based upon the moisture-free cellulose content of said film structure, which comprises passing said moisture-laden cellulose film structure over a plurality of heated drying rolls and allowing said film structure to shrink in its longitudinal direction between about 5% and about 11%, based upon the initial length thereof, by systematically relaxing said film structure and relieving the tension build-up therein in at least four relaxation steps before about 95% of the moisture in said film structure, based upon the initial moisture content thereof, is removed and wherein the film is allowed to shrink at least 3% before about 40% of the moisture is removed, while simultaneously maintaining said film structure under restraint or tension sufficient to maintain said film structure in intimate contact with the surfaces of said drying rolls whereby to provide a cellulose film structure having between about 3% and about 8% moisture, based upon the moisture-free cellulose content thereof, characterized by excellent sheet flatness and durability.

2. The process according to claim 1 wherein said film structure is tensilized at least 16 grams per inch of width thereof for maintaining said film structure in intimate contact with the surfaces of the drying rolls.

References Cited

UNITED STATES PATENTS 2,115,132  4/1938  Alles et al. _____ 264—198

FOREIGN PATENTS 538,979  4/1957  Canada.

JULIUS FROME, Primary Examiner

H. MINTZ, Assistant Examiner

U.S. Cl. X.R.

264—188, 198, 344